(12) United States Patent
Degtyar et al.

(10) Patent No.: US 7,321,894 B2
(45) Date of Patent: Jan. 22, 2008

(54) METHOD AND APPARATUS FOR BUILDING METADATA DRIVEN SOFTWARE DEVELOPMENT KIT

(75) Inventors: Rodion Degtyar, Sammamish, WA (US); Jagan M. Peri, Redmond, WA (US); Jigar B. Thakkar, Sammamish, WA (US); Kevin M. Whittenberger, Woodinville, WA (US); Michaeljon Miller, Bellevue, WA (US); Navin I. Thadani, Bellevue, WA (US); Andrey A. Zaytsev, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 433 days.

(21) Appl. No.: 11/025,322

(22) Filed: Dec. 29, 2004

(65) Prior Publication Data

US 2006/0143148 A1 Jun. 29, 2006

(51) Int. Cl.
*G06F 17/00* (2006.01)

(52) U.S. Cl. ..................... 707/101; 707/102

(58) Field of Classification Search ............. 707/1–3, 707/6, 10, 100–102, 103 R, 104.1, 200; 709/201, 709/203, 211, 216, 217, 220, 223, 227; 710/33, 710/36, 104

See application file for complete search history.

(56) References Cited

U.S. PATENT DOCUMENTS

| | | | | | |
|---|---|---|---|---|---|
| 6,085,198 | A | * | 7/2000 | Skinner et al. | 707/103 R |
| 6,470,332 | B1 | * | 10/2002 | Weschler | 707/3 |
| 6,507,833 | B1 | * | 1/2003 | Hichwa et al. | 707/1 |
| 6,604,110 | B1 | * | 8/2003 | Savage et al. | 707/102 |
| 6,621,505 | B1 | * | 9/2003 | Beauchamp et al. | 715/764 |
| 6,633,869 | B1 | * | 10/2003 | Duparcmeur et al. | 707/6 |
| 6,816,865 | B2 | * | 11/2004 | O'Brien et al. | 707/100 |
| 7,188,114 | B2 | * | 3/2007 | Liu et al. | 707/100 |

* cited by examiner

*Primary Examiner*—Jeffrey Gaffin
*Assistant Examiner*—Jacques Veillard
(74) *Attorney, Agent, or Firm*—Marshall, Gerstein & Borun LLP

(57) ABSTRACT

A metadata driven software development system provides various functionalities related to an entity of an application in the metadata format. Specifically, the system provides a set of base classes related to the entity and a set of methods and application programming interfaces for various operations to be performed on the entities in the metadata format. Defining such functionalities in the metadata format allows the system to dynamically generate XML messages matching any customized schema for that entity. Because such functionality is metadata driven, this system can be used with customized versions of the application without requiring any additional code or recompilation.

20 Claims, 7 Drawing Sheets

METHOD AND APPARATUS FOR BUILDING METADATA DRIVEN SOFTWARE DEVELOPMENT KIT

TECHNICAL FIELD

This patent relates generally to computer software and more particularly to business application software.

BACKGROUND

Modern day businesses cannot function efficiently without use of state of the art technology. Specifically, computers and software are an almost essential part of most of the businesses in developed economies. Typically, businesses use a number of off the shelf business applications, such as Excel® as well a number of custom applications specifically designed for a particular aspect of the business. There are a number of industry specific software applications that are developed by software companies to be used in a particular type of businesses, such as financial services, medical services, etc.

While such industry specific software applications are generally designed with specific characteristics of particular type of business in mind, they still need to be modified to be more suitable for use by the end user. Customer relationship management (CRM) software is one such example of a business application that is often modified by either the end user or by an independent software vendor (ISV) specializing in this particular type of software. Other examples of such applications that may need to be modified by a user or by an ISV include various business applications, such as an enterprise resource planning (ERP) system, a distributed accounting system, a material requirement planning (MRP) system, a project management system, etc.

Most business applications are generally highly customizable applications that can be customized by each customer with their unique needs. Typical customizations include addition of attributes to an existing entity, adding new entities, etc. Software development kits (SDKs) for various applications, including CRM application, generally present a programmatic way of accessing data in the application. For example, an SDK may have an application programming interface (API) that will allow a developer to programmatically update a zip-code attribute of an account. Generally, SDKs need to be easy to use to enable an independent software vendor or other users to develop rich applications on top of the original applications.

When applications are customized, the list of entities, their properties and their relationships may change from their original properties and relationships. In this case, it is a challenge to develop an easy-to-use SDK that can also handle these and other effects of customizations made on an application. For example, if new entities are added to the application, an SDK developed on the original application generally will not be aware of the newly added entities, their properties and their relationships. One approach may be to re-generate the SDK every time a customization is made. However, with a number of ISVs developing customized applications for different end users, such revision of the SDK can soon become a very cumbersome and expensive task. Moreover, changes made to the SDK have to be compiled and updated binary files have to be distributed to various client computers running the application using the SDK. Therefore, there is a need to provide a new approach to building SDKs for software applications that can accommodate the customizations made to the software applications.

SUMMARY

A metadata driven software development system provides various functionalities related to an entity of an application in the metadata format. Specifically, the system provides a set of base classes related to the entity and a set of methods and application programming interfaces for various operations to be performed on the entities in the metadata format. Defining such functionalities in the metadata format allows the system to dynamically generate XML messages matching any customized schema for that entity. Because such functionality is metadata driven, this system can be used with customized versions of the application without requiring any additional code or recompilation.

An implementation of the metadata driven software development system provides a software development system for customizing a target application having a plurality of entities, including a base class module comprising a set of base classes defining the plurality of entities in metadata format, an interface module comprising a set of methods to be performed on the plurality of entities in metadata format, and an API module adapted to store a set of APIs defining various operations to be performed on the plurality of entities in metadata format.

An alternate implementation of the metadata driven software development system provides a method of customizing a target application having a plurality of entities, the method comprising defining an entity of the plurality of entities in metadata format; providing a customization system with access to the metadata definition of the entity; providing a set of base classes to use metadata for the entity to perform at least one of: (1) manipulating a property of an instance of the entity and (2) constructing a query to influence the instance of the entity received from the target application; and serializing the base classes to generate an xml message to be communicated to the target application.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Network

Figure 1:
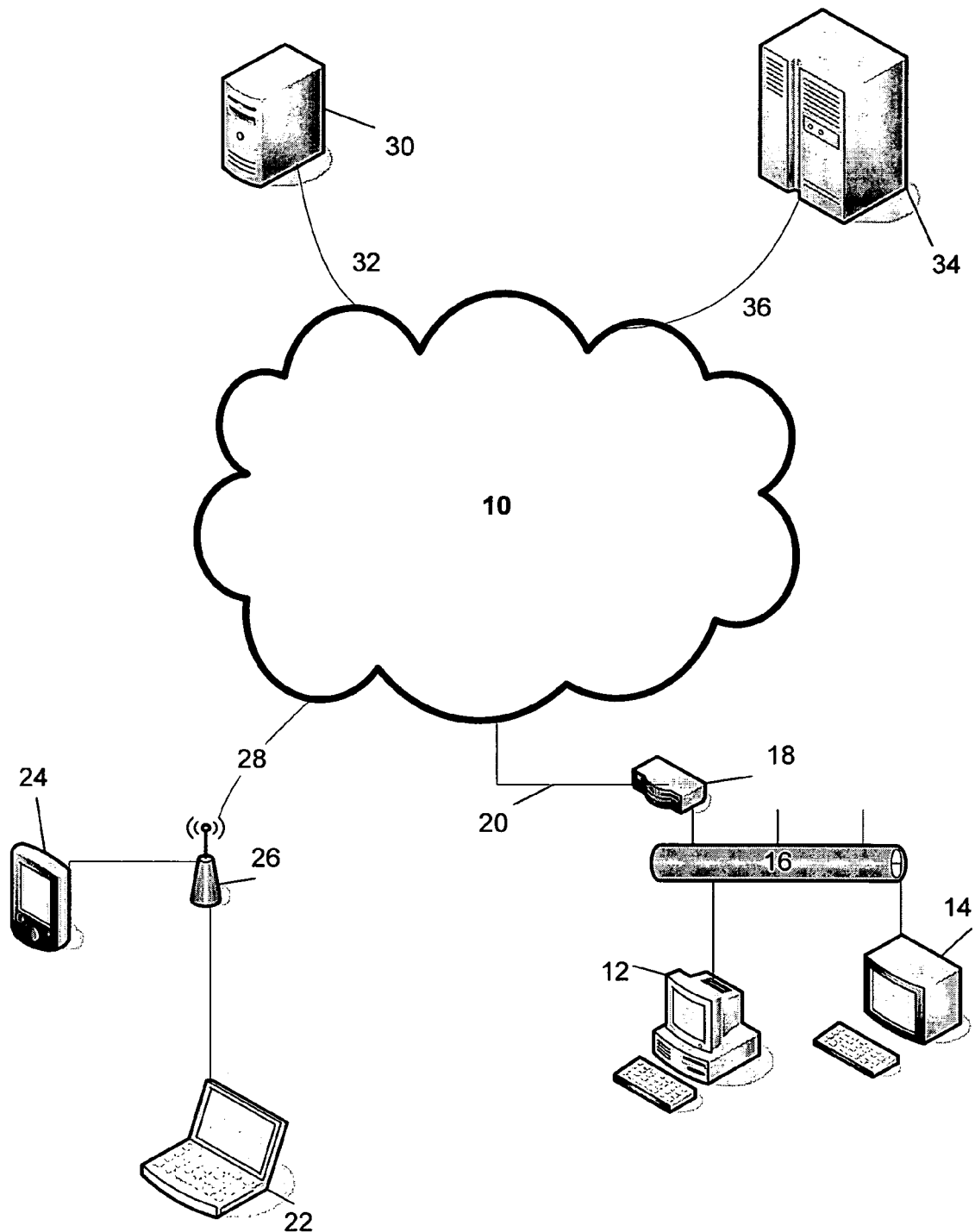
FIG. 1 is a block diagram of a network interconnecting a plurality of computing resources.

FIG. 1 illustrates a network 10 that may be used to implement an XML versioning system described herein. The network 10 may be the Internet, a virtual private network (VPN), or any other network that allows one or more computers, communication devices, databases, etc., to be communicatively connected to each other. The network 10 may be connected to a personal computer 12 and a computer terminal 14 via an Ethernet 16 and a router 18, and a landline 20. On the other hand, the network 10 may wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36. As it will be described below in further detail, one or more components of the dynamic software provisioning system may be stored and operated on any of the various devices connected to the network 10.

Computer

Figure 2:
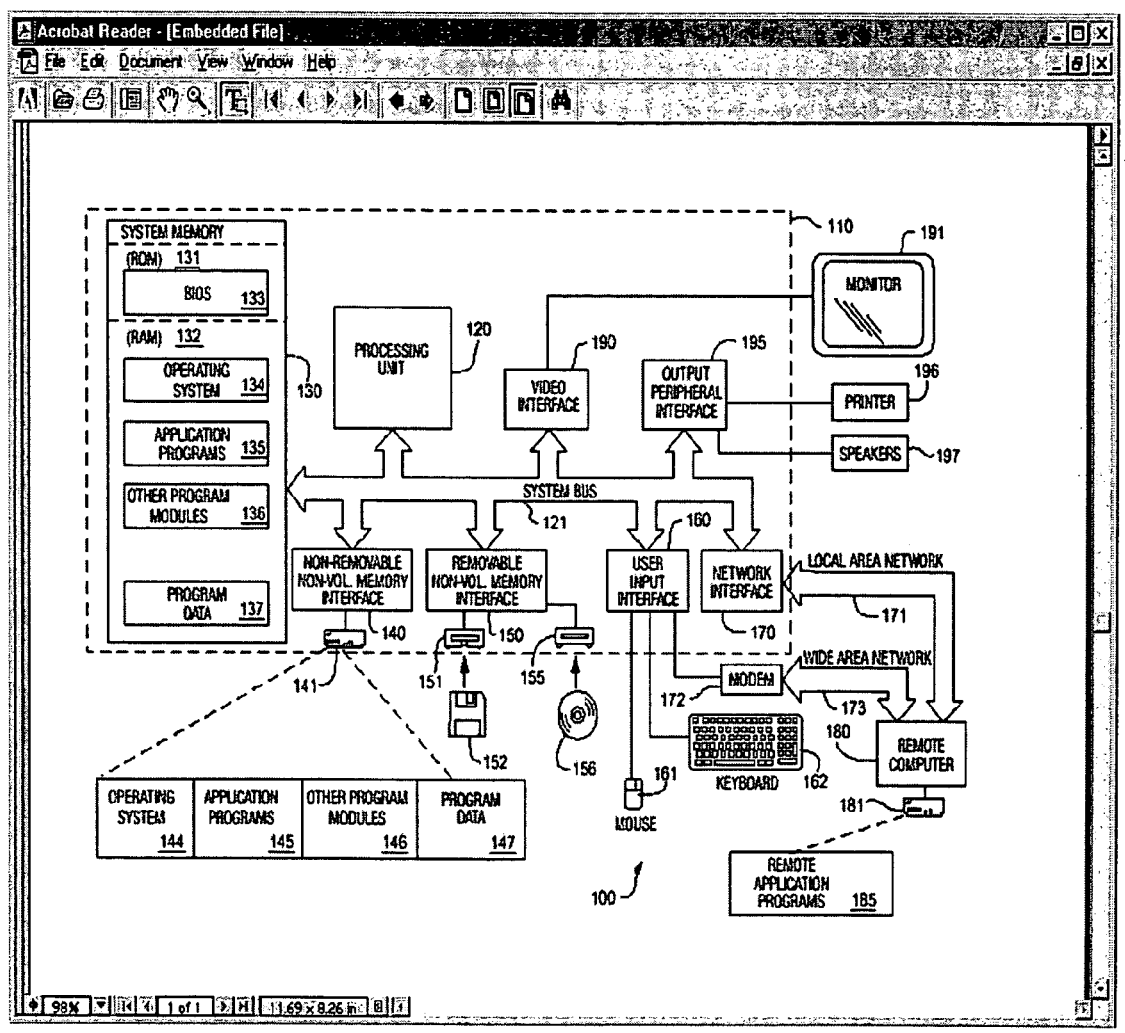
FIG. 2 is a block diagram of a computer that may be connected to the network of FIG. 1.

FIG. 2 illustrates a computing device in the form of a computer 110 that may be connected to the network 10 and used to implement one or more components of the dynamic software provisioning system. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Metadata Driven Business Logic Processing

Figure 3:
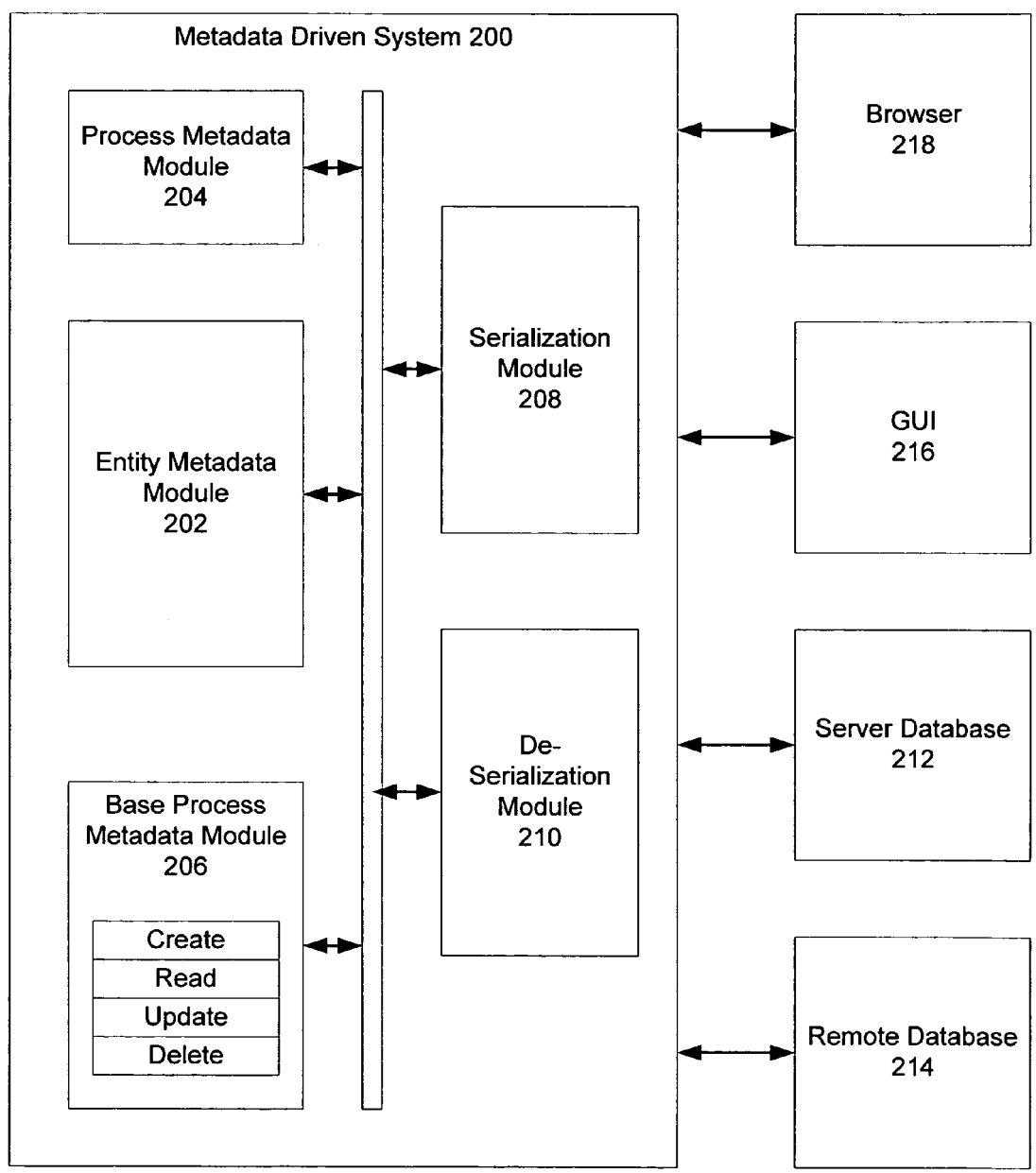
FIG. 3 illustrates a block diagram of a metadata driven system that may be used for managing applications on the network of FIG. 1.

FIG. 3 illustrates a block diagram of a metadata driven system 200 that may be used for managing various applications on the network 10 of FIG. 1. The system 200 may include an entity metadata module 202, a process metadata module 204, a base process metadata module 206, a serialization module 208 and a de-serialization module 210. The system 200 may communicate with a server database 212, a remote database 214, a graphical user interface (GUI) 216 and a browser 218. Various modules of the system 200 may be implemented on any of the various computing devices, such as the server 30, the desktop computer 12, etc., of the network 10. When implemented on the computer 110, the system 200 may be stored on the ROM 131, on the RAM 132, or any other similar location.

The system 200 may be used to implement a middleware for an application, such as a customer relation management (CRM) application that accesses various data on the server database 212 and on the remote database 214. While the system 200 is illustrated in here to implement a CRM application, any number of alternate applications can be implemented using the system 200. For example, in an alternate implementation, the system 200 may be used to implement a human resource management application on a network, such as the network 10. Other examples of applications that may be implemented using the system 200 include various business applications, such as an enterprise resource planning (ERP) system, a distributed accounting system, a material requirement planning (MRP) system, a project management system, etc.

The system 200 may use the GUI 216 and browser 218 to communicate with users of the system 200. Moreover, one or more application programs, such as the application program 135 stored on computer 110, may interact with the system 200. The system 200 may communicate with the various devices on the computer 110 using the system bus 121, or any other manner well known to those of ordinary skill in the art. Similarly, the system 200 may communicate with various devices on the network using the local area network 171, the wide area network 173, etc.

Now referring to the specific components of the system 200, the entity metadata module 202 may define various properties of an entity used by an application. Such an entity may be, for example, an account table for customer account data of a CRM application, a sales table for sales data in an inventory management application, etc. As it is well known to those of ordinary skill in the art, metadata in general represents information about entities and their relationships. The entity metadata module 202 may include properties of various entities, including properties for various entities created by an end user or by an independent software vendor (ISV). Examples of some of the properties that may be represented by the entity metadata module 202 may be the data type of the entity, the size of the entity, security information regarding the entity, relationship of the entity with other entities, etc. Whereas, the block diagram in the FIG. 3 illustrates only one block for entity metadata module 202, it is to be understood that in an implementation of the system 200, the structure of the entity metadata module 202 may be highly complex, including different entity metadata modules for different entities, where one or more of such plurality of entity metadata modules may be interrelated to each other.

The process metadata module 204 may represent various processes related to an entity. For example, when an entity represents a contract, that provides information regarding a sales contract, a process related to the contract entity may be a contract renewal process, which may involve business logic and may be implemented by a ContractProceeObject.Review( ) method. In this case, the process metadata module 204 may represent the ContractProceeObject.Review() method. If a process represented by the process metadata module 204 needs one or more sub-processes, such sub processes may also be provided within the process metadata module 204.

The process metadata module 204 may include various processes developed by an original developer of an application using the entity and supplied with the initial implementation of the application. However, a user, an ISV, etc., also may develop and provide additional processes that may be added to the process metadata module 204. In such a situation, the process metadata module 204 may include metadata representing information about the additional processes and other information which may be necessary to create and/or invoke instances of such additional business processes.

Allowing a third party vendor to develop and provide one or more processes using the process metadata module 204 allows adding different functionalities to an application without having to compile and deploy such added functionalities into the application. Moreover, if an ISV adds an entity to an application, while the properties of such added entity are stored in the entity metadata module 202, various processes to be performed upon such added entity may be stored in the process metadata module 204.

The base process metadata module 206 stores various basic processes that may be used by various processes of an application, including the processes stored in the process metadata module 204. For example, the base process metadata module 206 is shown to include a create process, a read process, an update process and a delete process, are shown in FIG. 3. However, many more base processes related to security, data persistence, etc., may also be stored in the base process metadata module 206. Thus for example, the ContractProceeObject.Review() method stored on the process metadata module 204 may call an update process from the base process metadata module 206 to update a contract entity, where the properties and relationships of such contract entity may be stored on the entity metadata module 204.

The serialization module 208 may include processes for converting an in-memory object representation of an entity into a format that can be sent over a network or saved to be disk or other storage media. Similarly, the de-serialization module 210 may include a de-serialization process for converting data from a memory or data received from a network into an in-memory object representation, which can be used by one or more processes stored on either of the process metadata module 204 and the base process metadata module 206.

Figure 4:
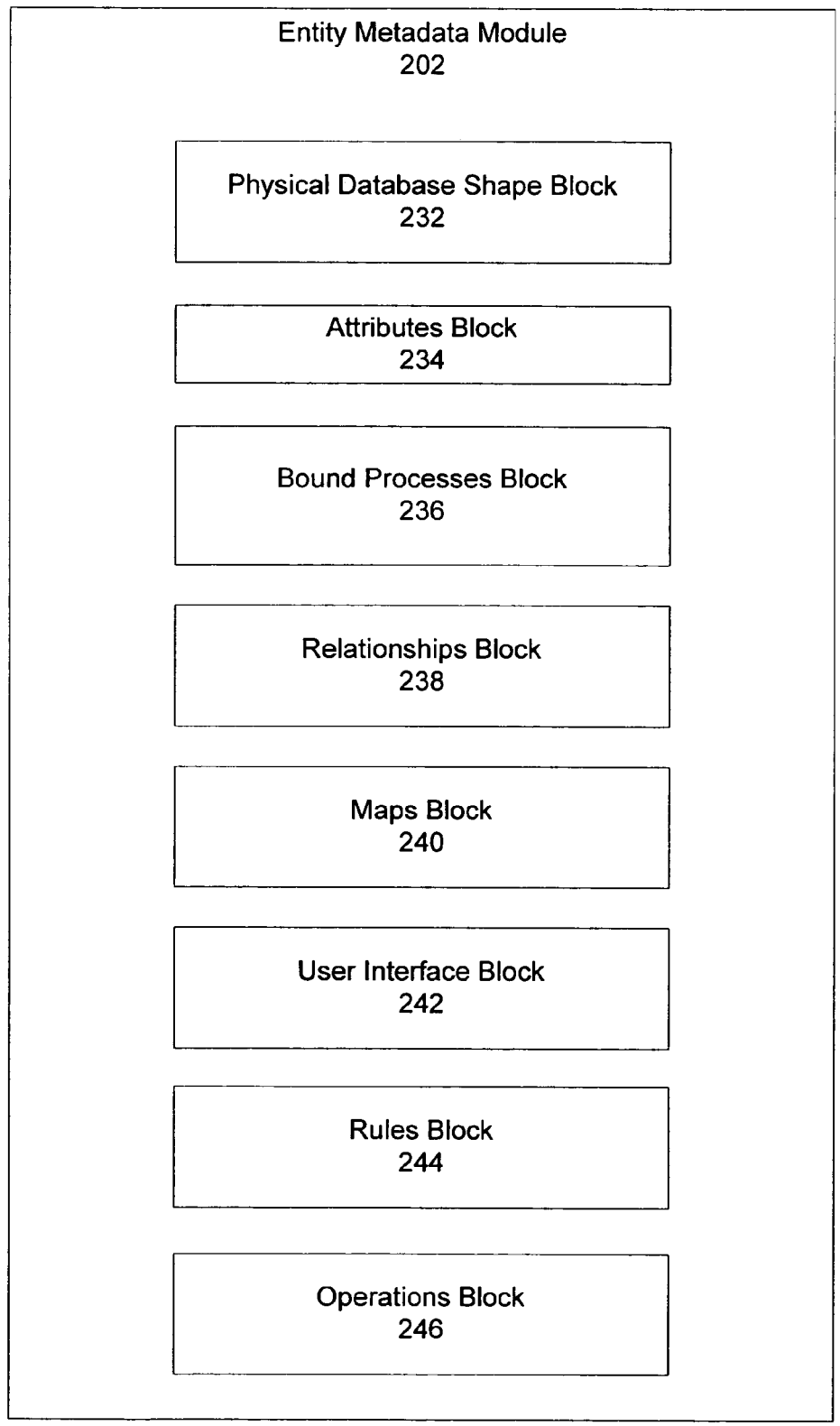
FIG. 4 illustrates a block diagram of an entity metadata module that may be used by the metadata driven system of FIG. 3.

FIG. 4 illustrates a detailed block diagram of various components that may be stored in the entity metadata module 202 of FIG. 3. As discussed above, the entity metadata module may be used to store information about various entities created during the original design of the application as well as information about various entities that may be added by an ISV or a user of the application. While FIG. 4 illustrates various information stored in the entity metadata module in different blocks, a person of ordinary skill in the art would recognize that one or more of these blocks may be merged together or one or more of these blocks may be further divided into various sub-blocks. Moreover, each of these blocks may access information from the other blocks by using a common communication bus such as the system bus 121 of the computer 110.

More specifically, the entity metadata module 202 may include a physical shape block 232, an attribute block 234 including various attributes of the various entities, a bound processes block 236 including various processes bound to the various entities, a relationship block 238 including various relationships of—and between—the various entities, a maps block 240 including entity maps for the various entities, a user interface block 242 including various user interfaces used with the various entities and a rules block 244 including various rules regarding one or more of the various entities.

The physical shape block 232 may store definitions of various entities' physical database shape such as table definitions, view definitions, etc, in the metadata format. For example, when for a customer entity related to a CRM application, the physical shape block 232 may store information regarding the number of columns in a customer table, the memory address for the customer table, etc.

The attributes block 234 may store various information related to the attributes of the entities in the metadata format. For example, a security attribute of an entity may specify whether a user or a process has a security privilege to view or change information about the entity. One or more attributes of an entity may be specified by the original designer of an application and/or by an ISV. Moreover, for certain entities such attributes may be changed by a user and for other entities such attributes may not be changed by the users.

The bound processes block 236 may specify processes bound to various entities in the metadata format, where such processes may be stored in the process metadata module 204, the base process metadata module 206, or in some other format. An example of a process bound to a customer entity may be a "generate e-mail" process that causes the application to generate an e-mail at every fixed period. Another example of a process bound to a sales person entity may be an "update location" process that updates a local phone number of a sales person every time the application receives travel information related to the sales person.

The relationships block 238 may specify, in the metadata format, various relationships between the various entities related to the application. For example, in a human resource application implemented by the system 200, the relationship block 238 may specify that a relation between a manager and an employee is one-to-many, whereas a relation between a manager and a secretary is one-to-one. The relationship block 238 may also specify relationships for entities added by an ISV or by a user.

The maps block 240 may specify, in the metadata format, various rules for constructing other entities based on various existing entities in an application. For example, the maps block 240 of an accounting system may specify rules for creating an invoice entity based on a customer entity, a product entity, a sales tax entity, etc.

The user interface block 242 may specify, in the metadata format, various layouts, views, pick-lists, etc., for entities related to an application. For example, the user interface block 242 related to a particular raw material entity in a MRP application may specify that the pick-list for that particular raw material should list the most commonly used materials at the top of a pick-list or that the most cost effective shipping alternative for that material at the top of a pick-list, etc.

The rules block 244 may specify, in the metadata format, various rules related to one or more entities in an application, such as a validation rule, a cardinality rule, etc. For example, the rules block 244 of a CRM application may specify that any update to a customer refund entity higher than a first amount must be validated by a manger entity. As another example, a validation rule stored in the metadata format in the rules block 244 for a human resources application may specify that any update to an employee bonus entity must be validated by two manager entities.

Furthermore, the entity metadata module 202 may also include an operations block 246 describing various operations related to entities of the target application. For example, the operations block 246 may store a create operation including requirements for offline playback support, offline transaction support, etc. Similarly, the operations block 246 may also store a retrieve operation including information that the retrieve operation does not need offline playback support, offline transaction support, etc.

Metadata Driven Software Development Kit

Figure 5:
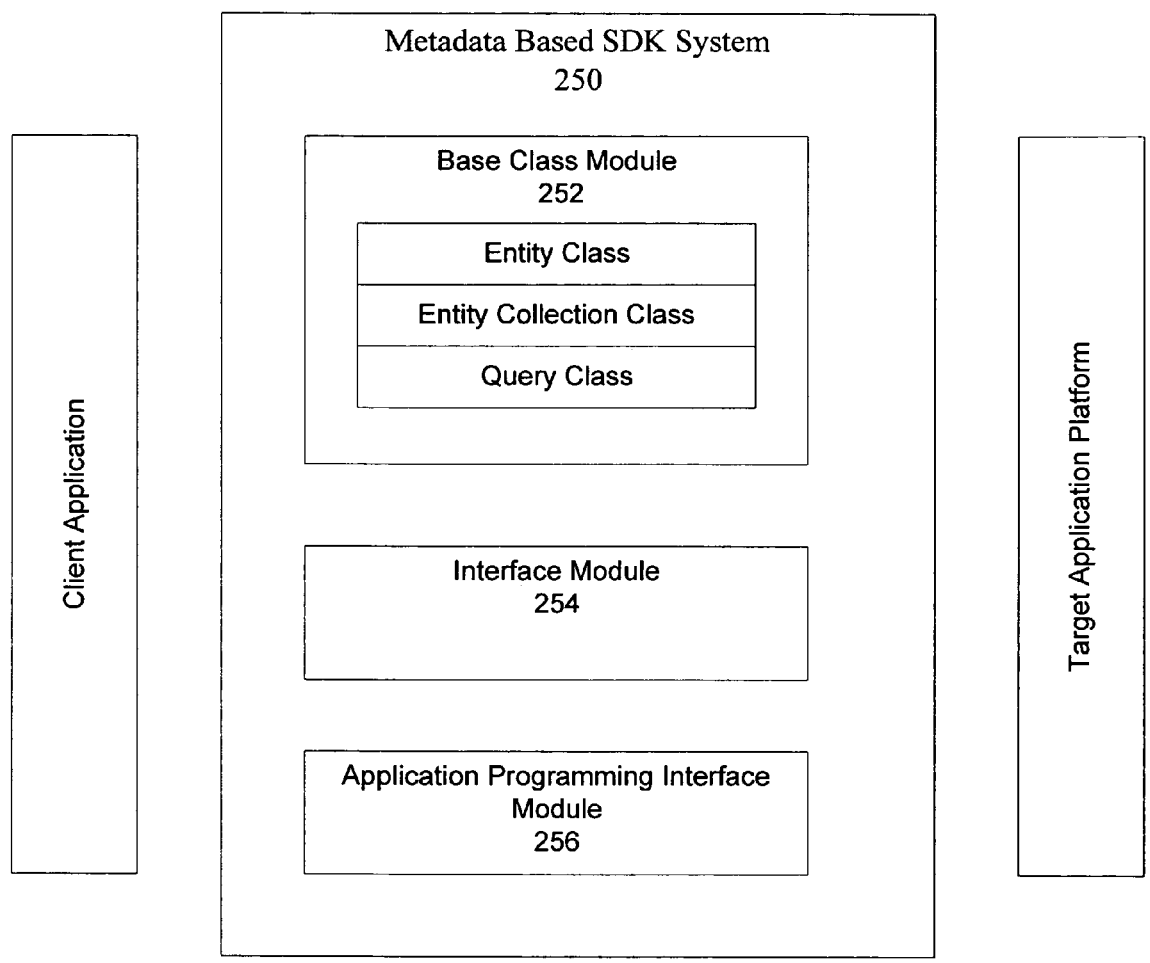
FIG. 5 illustrates a block diagram of a metadata based SDK system 250 using the metadata driven system of FIG. 3.

FIG. 5 illustrates a block diagram of a metadata based SDK system 250 that uses various components of the metadata driven system 200 of FIG. 3. Various components of the SDK system 250 may be implemented in metadata format to facilitate easier updating or design changes in a target application. For example, the SDK system 250 may be used to make changes or updates to a target application such as a CRM application, an enterprise resource planning (ERP) application, a material requirements planning (MRP) application, a human resource management application, etc. The SDK system 250 provides various information necessary for developers to integrate their client application into the target application, such as a CRM application, or to build additional features on the target application platform.

The exemplary SDK system 250 may include a base class module 252, an interface module 254 and an application programming interface (API) module 256. Note that while the SDK system 250 is shown to have the various modules 252-256 distinct from each other, in an alternate implementation, these modules may be communicatively connected to each other. These modules may be implemented on a single SDK server location or alternatively, various modules may be located at various locations on a network.

The base class module 252 may include various classes to represent entities, entity collections and/or various queries on the target application platform. For example, an implementation of the base class module may include a BusinessEntity base class that holds a collection of properties that hold a key-value pair for an entity such as an account, a client, etc. Another example of a base class may be a BusinessEntityCollection base class that holds a collection of instances of the above referenced BusinessEntity classes. For example, BusinessEntityCollection base class may provide security property for a collection of the above referenced BusinessEntity classes. Yet another example of base class may be a QueryExpression base class that allows the client application to construct custom queries on the target application platform. Other examples of base classes include base classes related to being able to programmatically construct queries, such as the ColumnSet class, which represents attributes to be retrieved from the target application platform, the FilterExpression class, which represents filters for narrowing result-sets received from the target application platform, the OrderExpression class, which represents sorting of the result-sets received from the target application platform, etc.

The base class module 252 may be designed in a manner so that a particular base class may be able to generate an XML message based on the metadata for an entity represented by that particular base class. Moreover, the base class module 252 may be designed so that instances of the various entities represented by the base classes may also be created from an XML message received by the base class module from the target application platform. Such capability for generating XML messages based on metadata for an entity and to generate an instance of the entity represented by that base class provides an easy-to-use programming model to users of the SDK system 250, while also providing extensibility.

The interface module 254 provides interfaces to get or to set attributes values for various entities of the target application platform. The interface module 254 is designed so that these interfaces work with both predefined system attributes as well as various custom attributes of various entities, where such custom attributes may be added by an ISV or a user of the target application. Generally, a class, such as an Account class, may use a mixed programming model having both strongly typed member model where strongly typed members may represent system attributes that cannot be changed or deleted, as well as a property-bag based model allowing access to custom attributes and system attributes that may be modified. The interface module 254 may be designed in a manner such that the class accepted by the SDK system 250 is extensible due to the metadata driven description of the class. In one exemplary implementation, SDK system 250 may employ the property bag based approach to handle such custom attributes of various entities, thus providing easy extensibility without a need for recompilation or code generation at customer installations of the target application. However, one of ordinary skill in the art would appreciate that alternate approaches to handle attributes of various entities may also be used. When an attribute value of an entity is get or set, the interface module 254 may use the metadata about the entity, as defined in the entity metadata module 202, to identify if the specified attribute name exists for the entity or not. Similarly, the interface module 254 may also determine if the attribute type of the value being set for the entity matches the attribute type of the entity as defined in the entity metadata module 202.

The API module 256 includes various APIs necessary to perform various operations on various entities in the target application. For example, the API module 256 may include APIs for a create operation, a retrieve operation, an update operation, a delete operation, etc. These APIs make web service requests to the target application platform, where such requests are processes and its results are returned back to the API module 256. In a particular implementation, these APIs may be designed to generate XML messages based on the metadata for the various entities stored in the entity metadata module 202 and send such XML messages to the target application platform.

Yet another implementation of the API module 256 may also include an API to retrieve a collection of entities sent to the API module 256 in an XML message, to retrieve a collection of relationships between various entities in an XML format, etc. Moreover, these APIs may be designed to handle both the system entities and any custom entities added by an ISV or a user.

Figure 6:
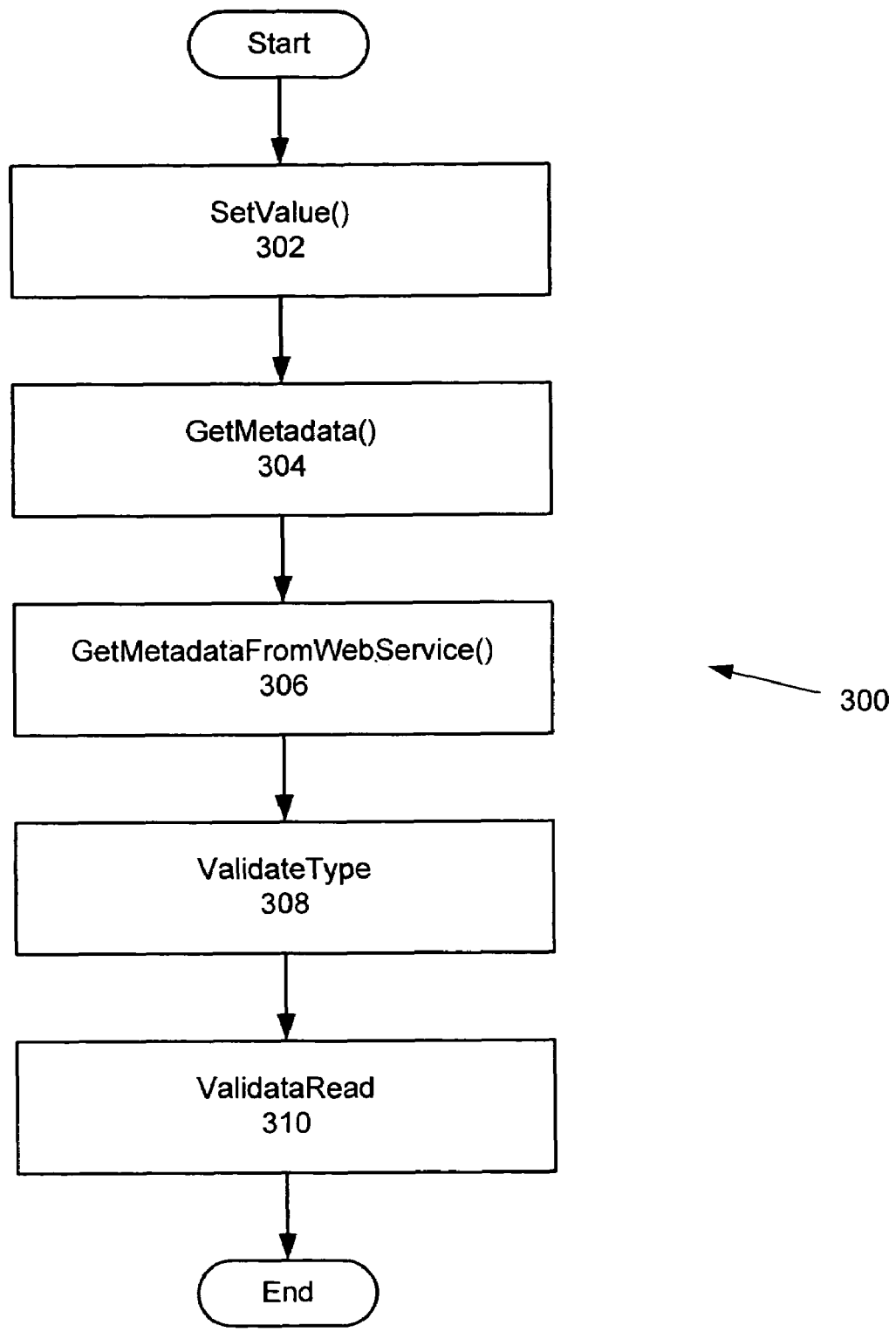
FIG. 6 illustrates a flowchart of a method of using the metadata based SDK system of FIG. 5.

FIG. 6 illustrates a flowchart 300 for typical sequence of actions during an exemplary use of the SDK system 250 of FIG. 5. More specifically, the flowchart 300 illustrates a sequence of actions at the SDK system 250 when an action account["name"]="AnyName" is executed to set the name attribute of an entity named account to "AnyName." Note that this illustration is just one example of the functioning of the SDK system 250, an alternate implementation may also be provided. Moreover, the sequence of steps as specified in the flowchart 300 may also be implemented in an alternate order.

At a block 302, the client application sends a SetValue() request to the SDK system 250 to set a value of a particular property of an entity. For example, in this implementation, such a request may be for setting the name property of the account entity to a value equal to "AnyName." Alternatively, the request may be to set another property of the account entity, such as, for example, a type property of the account entity to character type.

When the SDK system 250 receives this request, at a block 304, an API in the API module 256 may send a GetMetadata() request to a metadata cache, wherein the metadata cache is an in-memory cache of metadata about the entity. Alternatively, the metadata cache may be in the form of the entity metadata module 202. For example, an implementation of metadata cache may also contain an object-oriented programming model for the account entity that allows other applications to look up information about the entity from the metadata cache. In response to the request from the SDK system 250, the metadata cache may return the object-oriented programming model, or any other information about the properties of the account entity.

In response to the request from the SDK system 250, at a block 306, the metadata cache may send a web service request to the target application platform to get the properties of the account entity. Thus if there was any change to the properties of the account entity, due to, for example, customization, the metadata cache receives such updated property information. If the target application platform sends information about the properties of the account entity in an XML message, an API at the API module 256 may be used to interpret the XML message and save the properties to the metadata cache.

Subsequently, at a block 310, the SDK system 250 may execute a RunTime Validator class from the base class module 252 to validate the type of the account entity against the type provided by the client application. Runtime validation may also include enforcing data validation rules, such as whether an attribute is nullable or not, minimum and maximum values, data ranges, etc. Generally, the target application platform always performs such validation, however, providing these validations on the SDK system 250 allows for a more reliable and robust error checking. In an alternate implementation, such validation may be performed at the request of a client application using the SDK system 250.

Similarly, at a block 312, the SDK system 250 may execute the RunTime Validator class from the base class module to verify correctness of a value being placed in an attribute based on a business rule supplied in the entity metadata module 202. For example, a date attribute of an entity may have a specific range validator rule supplied with it and stored in the entity metadata module 202. Similarly, a memo attribute of an entity may have a length validator rule supplied with it and stored in the entity metadata module 202. Note that while the flowchart 300 illustrates the functioning of the SDK system 250 in response to an update action requested by the client application, a person of ordinary skill in the art would appreciate that many other requests from the client application may be serviced by the SDK system 250.

Figure 7:
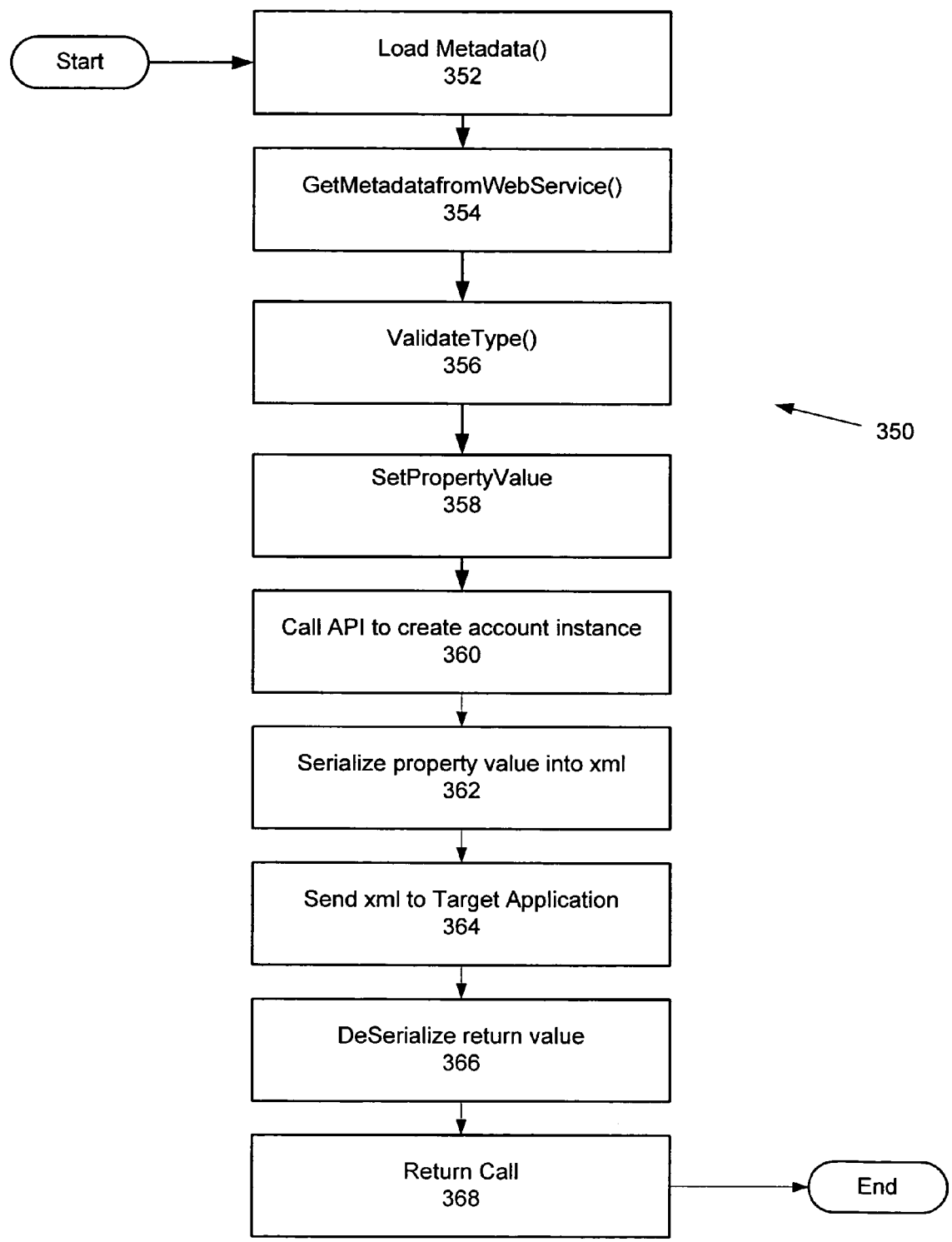
FIG. 7 illustrates flowchart of another method of using the metadata based SDK system of FIG. 5.

FIG. 7 illustrates a flowchart 350 for typical sequence of actions during another exemplary use of the SDK system 250. More specifically, the flowchart 350 illustrates a sequence of actions at the SDK system 250 when a client application uses the SDK system 250 to create a new instance for an entity, such as an account entity. Note that the sequence of steps as specified in the flowchart 350 may also be implemented in an alternate order.

When the SDK system 250 receives a request from the client application to create a new instance for the account entity, at a block 352, the client application may generate and send a LoadMetadata() request to a metadata cache, wherein the metadata cache is an in-memory cache of metadata about the entity.

In response to the LoadMetadata() request, at a block 354, the metadata cache may generate and send a GetMetadataFromWebService() request to the target application or to the entity metadata module 202 which may store the metadata related to the account entity.

Upon receiving the metadata related to the account entity, at a block 356, the SDK system 250 may validate the type property of the account entity with type of a value received from the client application, where the value is to be assigned to the new instance of the account entity.

Once it is determined that the type of the value received from the client application is appropriate for the instance of the account entity, at a block 358, the SDK system 250 may set the type property of the newly created instance of the account to be equal to the type property received from the entity metadata module 202.

Subsequently, at a block 360, the SDK system 250 may invoke an API from the API Module 256 to create an instance of the account entity at the target application. A block 362 may serialize the property value of the account entity into an xml message and a block 364 send the xml message to the target application.

In response to receiving the xml message, the target application may send a return value to the SDK system 250. A block 366 may de-serialize the return value from the target application and returns a message to the client application initiating the call to create an instance of the account entity at the target application.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A method of customizing a target application having a plurality of entities, the method comprising:
   defining an entity of the plurality of entities in metadata format;
   providing a customization system with access to the metadata definition of the entity;
   providing a set of base classes to use metadata for the entity to perform at least one of: (1) manipulating a property of an instance of the entity and (2) constructing a query to influence an instance of the entity received from the target application; and
   serializing the base classes to generate an xml message to be communicated to the target application.

2. A method of claim 1, wherein manipulating a property of an instance of the entity further comprises at least one of:

(1) getting a value of an attribute for an instance of the entity and (2) setting a value of an attribute for an instance of the entity.

3. A method of claim 1, further comprising:
receiving an XML message from the target application;
generating a definition of the entity based on the XML message; and
storing a definition of the entity in metadata format.

4. A method of claim 1, wherein the set of base classes includes at least one of: (1) an entity class; (2) an entity collection class; and (3) a query expression class.

5. A method of claim 1, further comprising:
storing a set of methods to be performed on the entity in metadata format; and
storing a set of APIs defining various operations to be performed on the entity in metadata format.

6. A method of claim 5, wherein the set of methods includes at least one of: (1) an attribute get method and (2) an attribute set method.

7. A method of claim 5, wherein the set of APIs includes at least one of: (1) an API to create one of the plurality of entities; (2) an API to retrieve the definition of the one of the plurality of entities; (3) an API to update the definition of the one of the plurality of entities; (4) an API to delete the definition of the one of the plurality of entities; (5) an API to retrieve a definition of a collection from the plurality of entities; (6) an API to retrieve a definition of a collection of attributes of the one of the plurality of entities; and (7) an API to retrieve a definition of a collection of relationships of the one of the plurality of entities.

8. A method of claim 5, wherein the set of APIs includes at least one of: (1) an API to create an instance of one of the plurality of entities; (2) an API to update the instance of the one of the plurality of entities; (3) an API to delete the instance of the one of the plurality of entities; (4) an API to retrieve an instance of a collection from the plurality of entities; (5) an API to retrieve an instance of a collection of attributes of the one of the plurality of entities; and (6) an API to retrieve an instance of a collection of relationships of the one of the plurality of entities.

9. A method of claim 1, wherein the target application is at least one of: (1) a customer relationship management application; (2) an enterprise resource management application; (3) a human resource management application; (4) a material requirement planning application; and (5) an accounting system.

10. A method of claim 1, further comprising using metadata about one of the plurality of entities to determine at least one of: (1) whether an attribute name exists for the one of the plurality of entities and (2) whether the attribute type of the one of the plurality of entities matches an attribute type of a value being passed to the one of the plurality of entities.

11. A method of claim 1, further comprising defining a process in metadata format as a process metadata module, wherein the process contains logic related to one of the plurality of entities.

12. A customization system for customizing a target application having a plurality of entities, the system comprising a computer storage medium for storing:
an entity metadata module adapted to store an entity of the plurality of entities in metadata format;
an entity definition module adapted to access the metadata definition of the entity;
a base class module adapted to store a set of base classes to use metadata for the entity, the base class module further adapted to manipulate a property of an instance of the entity and to construct a query to influence the instance of the entity received from the target application; and
a serialization module adapted to serialize the base classes to generate an xml message to be communicated to the target application.

13. A system of claim 12, wherein the base class module is further adapted to get a value of an attribute for an instance of the entity and to set a value of an attribute for an instance of the entity.

14. A system of claim 12, further adapted to (1) receive an XML message from the target application; (2) generate a definition of the entity based on the XML message and (3) store a definition of the entity in metadata format.

15. A system of claim 12, further adapted to store a set of methods to be performed on the entity in metadata format and to store a set of APIs defining various operations to be performed on the entity in metadata format.

16. A system of claim 12, further comprising:
an interface module adapted to store a set of methods to be performed on the entity in metadata format; and
an API module adapted to store a set of APIs defining various operations to be performed on the entity in metadata format.

17. A system of claim 12, further comprising a process metadata module adapted to store a process in metadata format, wherein the process contains logic related to one of the plurality of entities.

18. A system of claim 12, wherein the target application is at least one of: (1) a customer relationship management application; (2) an enterprise resource management application; (3) a human resource management application; (4) a material requirement planning application; and (5) an accounting system.

19. A computer-storage medium having computer-executable instructions for performing a method of customizing a target application having a plurality of entities, the method comprising:
(a) defining an entity of the plurality of entities in metadata format;
(b) providing a customization system with access to the metadata definition of the entity;
(c) providing a set of base classes to use metadata for the entity to perform at least one of: (1) manipulating a property of an instance of the entity and (2) constructing a query to influence the instance of the entity received from the target application; and
(d) serializing the base classes to generate an xml message to be communicated to the target application.

20. A computer-storage medium of claim 19 further having computer-executable instructions for performing a method comprising:
(a) receiving an XML message from the target application;
(b) generating a definition of the entity based on the XML message; and
(c) storing a definition of the entity in metadata format.

* * * * *